United States Patent
Huang

(10) Patent No.: US 7,398,001 B2
(45) Date of Patent: Jul. 8, 2008

(54) OUTPUT CIRCUIT AND RELATED APPARATUS AND METHOD FOR ELECTRICALLY DETECTING WHETHER CABLE IS CONNECTED TO OUTPUT PORT OF OUTPUT CIRCUIT

(75) Inventor: Cheng-Chieh Huang, Taipei (TW)

(73) Assignee: ALI Corporation, Taipei (TW)

( * ) Notice: Subject to any disclaimer, the term of this patent is extended or adjusted under 35 U.S.C. 154(b) by 889 days.

(21) Appl. No.: 10/708,461

(22) Filed: Mar. 5, 2004

(65) Prior Publication Data

US 2005/0036758 A1 Feb. 17, 2005

(30) Foreign Application Priority Data

Aug. 11, 2003 (TW) .............................. 92121981 A

(51) Int. Cl.
*H04N 5/91* (2006.01)
*H04N 5/00* (2006.01)

(52) U.S. Cl. ......................................... 386/46; 386/125

(58) Field of Classification Search ........................ None
See application file for complete search history.

(56) References Cited

U.S. PATENT DOCUMENTS 5,473,229 A * 12/1995 Archer et al. ................ 318/254

FOREIGN PATENT DOCUMENTS

JP 2000267770 A * 9/2000

* cited by examiner

*Primary Examiner*—John W. Miller
*Assistant Examiner*—Heather R Jones
(74) *Attorney, Agent, or Firm*—Winston Hsu

(57) ABSTRACT

An output circuit of a player can detect whether a cable is electrically connected to an output port of the output circuit. The output circuit includes a signal circuit and a decision module for detecting whether a cable is connected by detecting voltage change at the output port. If the decision module determines that a cable is connected, the signal circuit will provide video or audio signals of the player to the output port. If the decision module determines that no cable connected, the signal circuit will provide a predetermined detecting signal with nonzero average power to the output port, such that the decision module can detect whether the output end is connected to a cable again by detecting voltage change of the detecting signal.

11 Claims, 7 Drawing Sheets

OUTPUT CIRCUIT AND RELATED APPARATUS AND METHOD FOR ELECTRICALLY DETECTING WHETHER CABLE IS CONNECTED TO OUTPUT PORT OF OUTPUT CIRCUIT

BACKGROUND OF INVENTION

1. Field of the Invention

The present invention relates to an output circuit for a player, and more particularly, to an output circuit of a player capable of detecting whether a cable is electrically connected to an output port of the output circuit.

2. Description of the Prior Art

In modern society, various kind of video or audio information is stored and recorded in electrical, magnetic or optical media. Accessing this stored information involves using video or audio players to read and transform data into electrical signals and then display these images or play this sound through video or audio media. Display media directly relate to the quality of their output video or audio signals so engineers make effort to improve video or audio players.

Please refer to FIG. 1. FIG. 1 illustrates function blocks of a conventional player by using an example of a CD player 10. The CD player 10 comprises an access circuit 12, an output circuit 14 and an output end 26. Generally speaking, modern players comprise a plurality of outputs and FIG. 1 shows one output end as a representative for convenience. If being plugged into the video/audio apparatus 18, the output end 26 is connected to the video/audio apparatus 18(for example, a TV) through the corresponding output cable 16. The CD player 10 reads the stored video/audio signals from the CD 20C, and transmits these signals to the video/audio apparatus 18 by the output end 26 and the output cable 16. To complete the above procedure, the access circuit 12 comprises a motor 20A and a reading head 20B. The CD 20C is driven to rotate and the reading head 20B read the stored data in the CD 20C. These data are decoded or demodulated and then become digital information signals 21A that are transmitted to the output circuit 14. There is a signal circuit 22 and an output port 24 corresponding to output end 26 in the conventional circuit 14. The signal circuit 22 can transform information signals 21A to output signals 21B that are properly adjusted for outputting. For example, signal circuits 22 can be a TV DAC (television digital-to-analog converter) that transforms digital information signals 21A to output signals 21B of suitable levels and output power. Through the output port 24 of the output circuit 14 and the output end 26, the output signals 21B can be transmitted to the video/audio apparatus 18 by the output cable 16 and the video/audio apparatus 18 shows images/sounds from these signals.

As mentioned above, modern video/audio players comprise a plurality of output ends for flexibility of application. However, an ordinary user would use some output ends for transmitting video/audio signals, while the other output ends are not used. Because the signal circuit 22 consumes some power when outputting the output signal 21B, if the corresponding output end 26 is not connected any video/audio apparatus but keeps outputting output signals 21B, power is wasted. To solve this problem, the conventional player 10 is equipped with a mechanically-driven switch 28 connected to the output end 26 outside the output circuit 14 in order to detect if the output end 26 is connected to the output cable 16 in a mechanical way.

In the conventional player apparatus 10, the operation principles of the mechanically-driven switch 28 are described in the following. When the output cable 16 is plugged in the output end 26, the end point of the output cable 16 will trigger the mechanically-driven switch 28 and the mechanically-driven switch 28 will feedback an electrical signal to the output circuit 14. The signal controlling circuit 22 processes the signal and outputs the output signals 21B to the output 24. Comparatively, when the output cable 16 is not connected to the output end 26, the mechanically-driven switch 28 will detect that the output end 26 connects to nothing. The mechanically-driven switch 28 will stop the signal controlling circuit 22 with the other electrical signal.

With the mechanically-driven switch 28, the player apparatus 10 can detect if the output end 26 connects the output cable 16. However, this prior art has some disadvantages. First, the mechanically-driven switch 28 is involved in integration of mechanical/electrical devices so the manufacturing procedures are complicated. It is both time-consuming and money-wasting. In addition, the mechanically-driven switch 28 detects connection of the output cable in a mechanical way so that plugging action wears down the apparatus and makes the display apparatus operate incorrectly. Third, functions of the output circuit 14 are often implemented by a chip, but the output circuit 14 must be equipped with more pins to receive signals of the mechanically-driven switch 28. This reason also complicates the circuit design and increases cost.

SUMMARY OF INVENTION

It is therefore an objective of the claimed invention to provide an output circuit in order to solve the above-mentioned problems.

According to the claimed invention, an output circuit comprises an output port electrically connected to an output cable in a detachable manner, a signal circuit electrically connected to the output port for providing a signal current to the output port, and a decision module electrically connected to the output port for determining whether the output port is electrically connected to the output cable according to a signal voltage of the output port.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
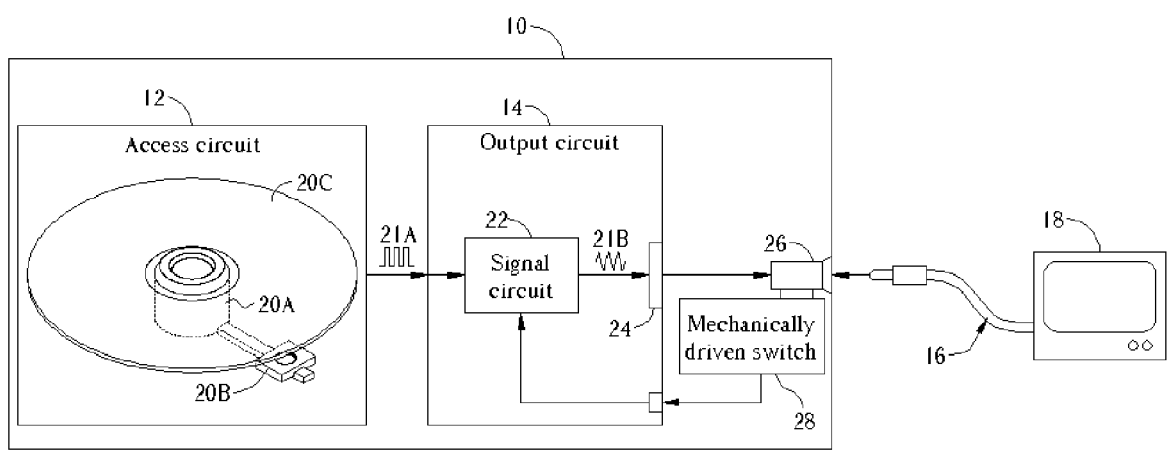
FIG. 1 illustrates function blocks of a conventional player.
Figure 2:
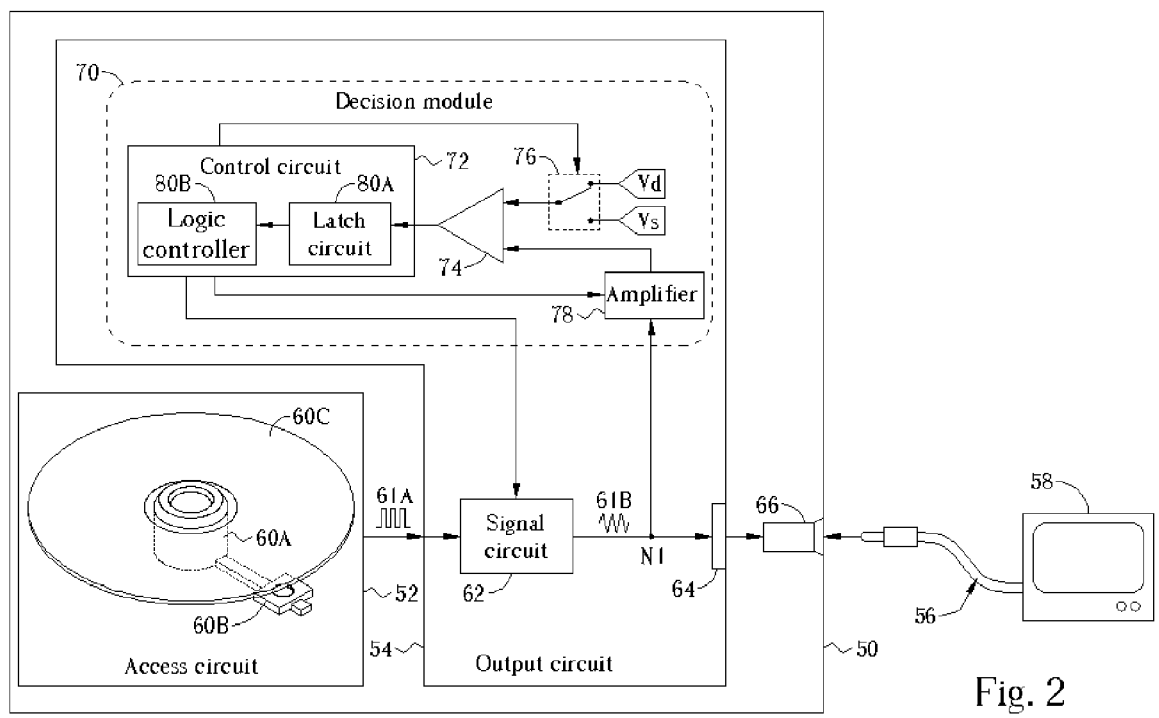
FIG. 2 illustrates function blocks of the present invention.

Please refer to FIG. 2. FIG. 2 illustrates function blocks of the playing apparatus 50 in the present invention. The playing apparatus 50 comprises an access circuit 52, an output circuit 54, and at least an output end 66 connected to a video/audio apparatus 58 with an output cable 56. The playing apparatus 50 can be a playing apparatus for images or sounds (like a CD player or DVD player). The access circuit 52 comprises a motor 60A and a reading head 60B to read video/audio data signals 61A from a CD 60C. The output circuit 54 comprises a signal circuit 62. This signal circuit 62 is connected to the output port 64 at a node N1 and can transform data signals 61A to suitable output signals 61B. For example, the signal circuit 62 can be a TV DAC to transform digital data signals 61A to analog output signals 61B. The output signals 61B can be outputted to the video/audio apparatus 58 through the output ports 64 of the output circuit 54, the output end 66, and the output cable 56. The video/audio apparatus 58 can be a TV, a display, a projector or a speaker, an amplifier. Of course, the playing apparatus 50 can have a plurality of output ends 66, but FIG. 2 shows one output end 66 for convenience of description.

To detect if the output cable 56 connects to the output end 66 of the playing apparatus 50, the output circuit 54 of the present invention comprises a decision module 70 to determine if the output end 66 connects to the output cable 56 by the electrical signals of the output port 64. In one embodiment of the present invention, the decision module 70 comprises a control circuit 72, a comparator 74, a switching circuit 76, and an amplifier 78. The control circuit 72 controls the decision module 70. The amplifier 78 amplifies signals and provides different amplifying gain under control of the control circuit 72. The comparator 74 comprises two inputs and an output end, and one input is connected to the node N1 through amplifier 78 to receive the amplified signals of the amplifier 78. The switching circuit 76 controlled by the control circuit 72 can select one voltage from the two values detecting threshold voltage Vd and signal detecting threshold voltage Vs, and pass it to the other end of the comparator 74. The comparator 74 compares the signals of two inputs and delivers compared results to the control circuit 72 through the output end so that control circuit 72 determines if the output end 66 connects to the output cable 56 according to signals of the output port 64. The control circuit 72 can be equipped with a latch 80A and a logic controller 80B. The latch 80A is used to receive and store the compared results of the comparator 74, and the logic controller 80B implements each control function of the control circuit 72 according to the data stored in the latch 80A.

Figure 3:
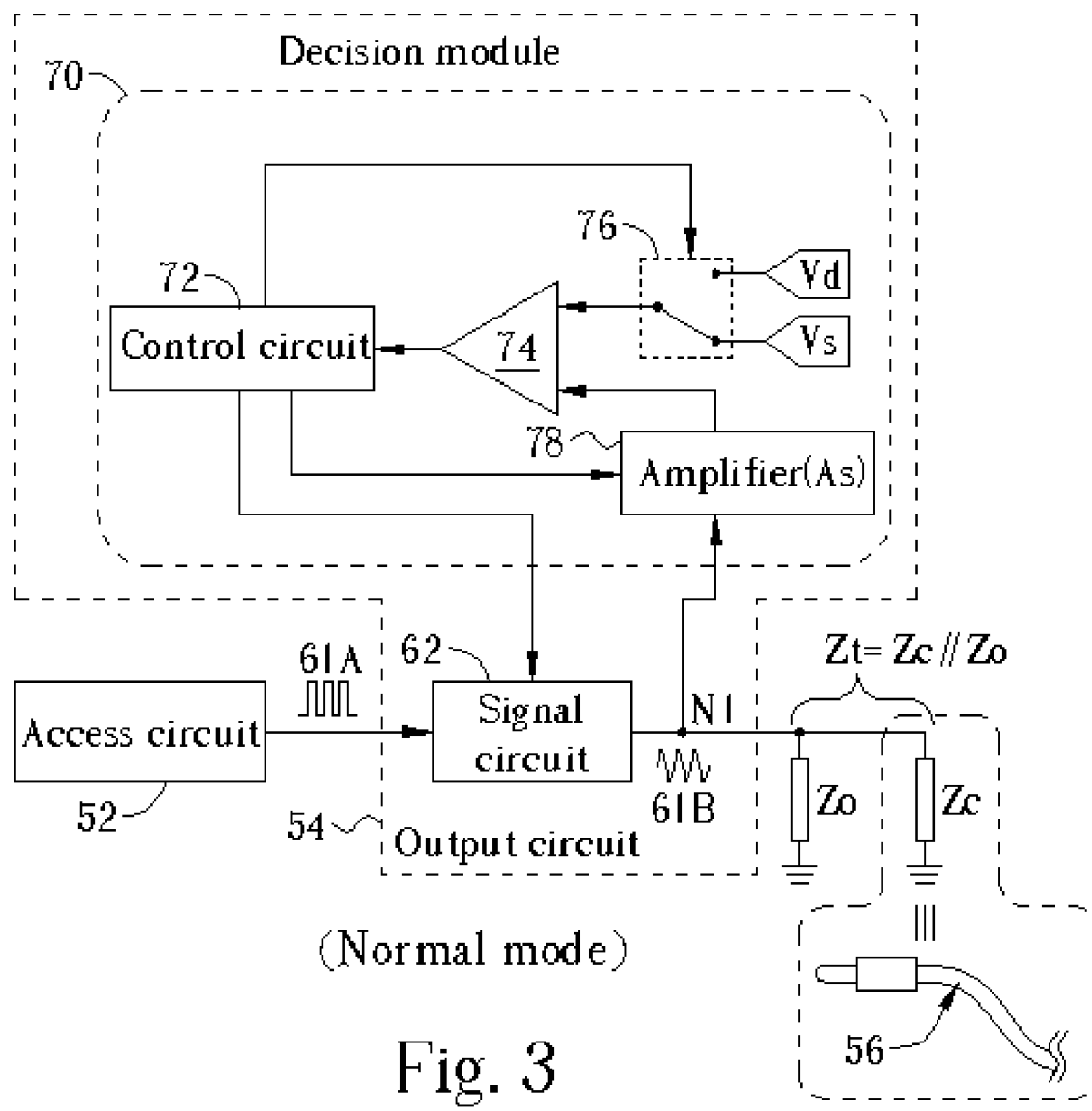
FIG. 3 illustrates the function blocks of the output circuit of FIG. 2 when the output circuit of FIG. 2 is operating in a normal mode.
Figure 4:
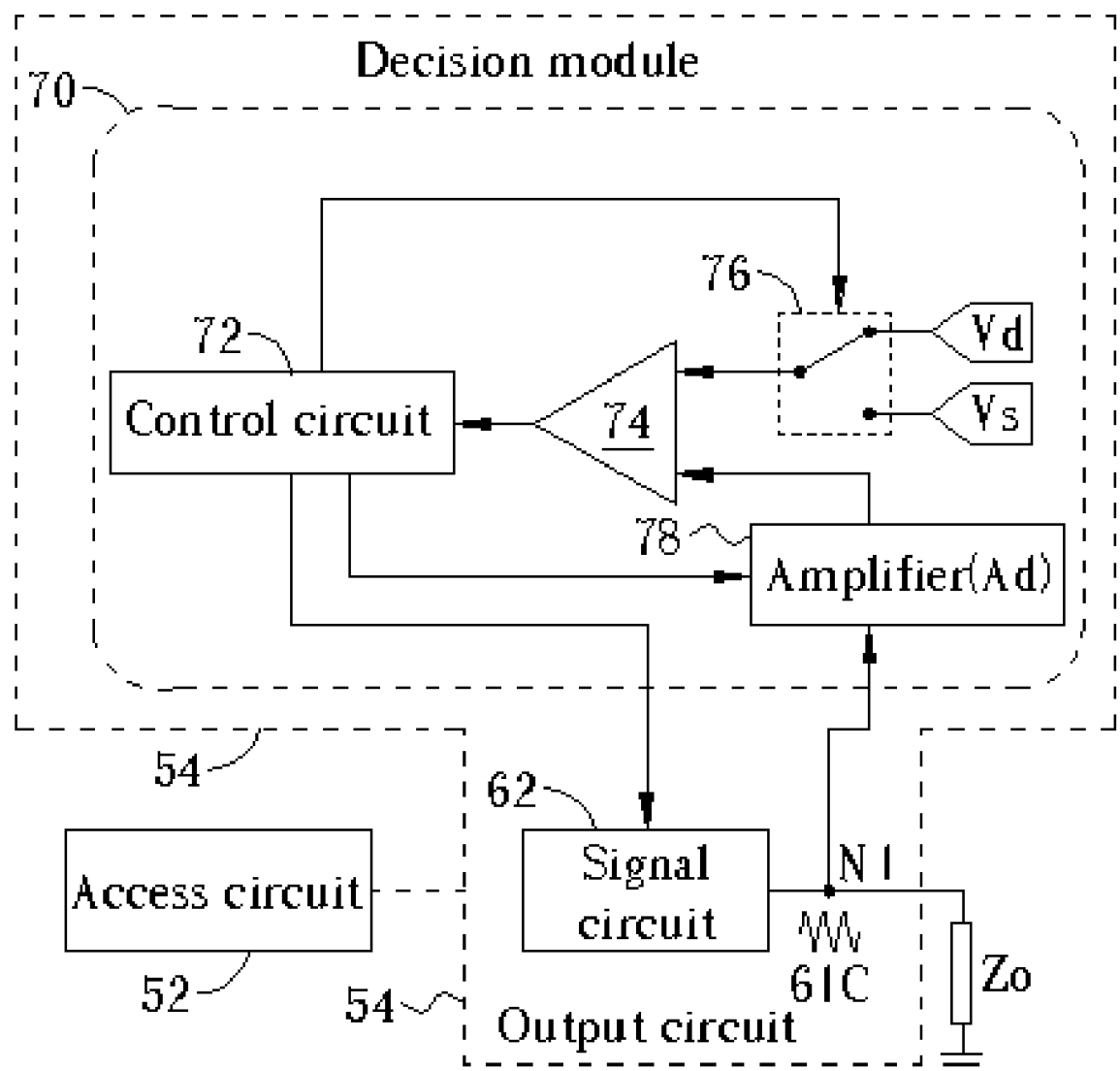
FIG. 4 illustrates function blocks of the output circuit of FIG. 2 when the output circuit of FIG. 2 is operating in a power-saving mode.

According to the results of the decision module 70, the control circuit 72 controls the output circuit 54 to operate in two modes. As for this situation, please refer to FIG. 3 and FIG. 4 (also FIG. 2). FIG. 3 and FIG. 4 illustrate function blocks of the playing apparatus 50 of FIG. 2 when the playing apparatus 50 is operating in different modes. As shown in FIG. 3, when the decision module 70 determines that the output cable 56 has connected to the node N1, it means the playing apparatus 50 has connected to the video/audio apparatus 58 through the output cable 56 and the playing apparatus 50 outputs the output signal 61B from the output end 66. Then, the decision module 70 makes the output circuit 54 operate in a normal mode. The signal circuit 62 transforms the video/audio data signals 61A provided by the access circuit 52 to the output signals 61B and the output signals 61B are outputted to the video/audio apparatus 58 through the output port 64 and the output end 66 so that images or sounds emerge. When the output cable 56 is connected to the output circuit 54 through the output end 66 and the output end 64, the characteristic impedance Zc of the output cable 56 will be equivalently connected in parallel with the output impedance Zo of the signal circuit 62 at the node N1 so that total output impedance of the signal circuit 62 at the node N1, expressed as Zt in FIG. 3, is a parallel connection of impedance Zo and Zc. In addition, in the normal mode, the control circuit 72 makes gain of the amplifier 78 to be As (As can be 1), and makes the switch circuit 76 set to signal threshold voltage Vs in order to keep detecting if the output cable 56 connects to the playing apparatus 50.

As shown in FIG. 4, when the output cable 56 is taken off from the output end 66 and disconnected with the output circuit 54, the characteristic impedance Zc of the output cable 56 is not connected to the node N1 anymore. Thus, total output impedance of the signal circuit 62 at the node N1 is Zo, the characteristic impedance of itself. Suppose that the output current of the signal circuit 62 at the node N1 is I. In the normal mode, when the output cable 56 still connects to the playing apparatus 50, the signal voltage of the node N1 should be Zt*I (Please refer to FIG. 3). When the output cable 56 does not connect to the node N1, signal voltage of the node N1 should be Zo*I (Please refer to FIG. 4). Because the total impedance Zt is a parallel connection of Zo and Zc, the total impedance Zt is smaller than impedance Zo. In other words, when the output cable 56 is taken off from the output end 66, signal voltage at the node N1 will become larger (from Zt*I to Zc*I). In the normal mode, the comparator 74 is to compare if signal voltage at the node N1 is larger than signal threshold voltage Vs. When setting the signal threshold voltage Vs, the designer should make this value is between As*Zt*I and As*Zo*I.

When decision module 70 determines that the output cable 56 has been taken off from the output end 66, the output circuit 54 will operate in the power-saving mode. Since the output cable 56 is not connected to the playing apparatus 50, it is not necessary for the signal circuit 62 to keep transforming the video/audio data signal 61A provided by the access circuit 52 to output signals, and the signal circuit 62 can stop functioning. However, as shown in FIG. 4, in the present invention, the signal circuit 62 still provides a predetermined low-power detecting signal 61C to detect if the output cable 56 will be connected to the output end 66. To implement this, the average power of this detecting signal 61C is set to be far lower than the power of the output signal 61B in the normal mode in order to lower power consumption. In addition, the control circuit 72 will control the amplifier to operate with a larger gain Ad (larger than gain As in the normal mode) to amplify the low power detecting signal 61C at the node N1. Also, the switch circuit 76 is set to detecting threshold voltage Vd so that the decision module 70, in the power-saving mode, can keep determining if the output cable 56 is connected to the output end 66 once more. Similar to the operation of the normal mode, in the power-saving mode, the comparator 74 is to detect if the amplified signal voltage from the node N1 amplified by the amplifier 78 is smaller than the detecting threshold voltage Vd. This detecting threshold voltage Vd is between Ad*Zt*Id and Ad*Zo*Id (Id represents current of detecting signal 61C). When the signal voltage at node N1 changes from the value larger than the detecting threshold voltage Vd to the value smaller than the detecting threshold voltage Vd, it means the output cable 56 connects to the output circuit 54 again and the decision module 70 makes the output circuit 54 change from the power-saving mode to the normal mode.

Figure 5:
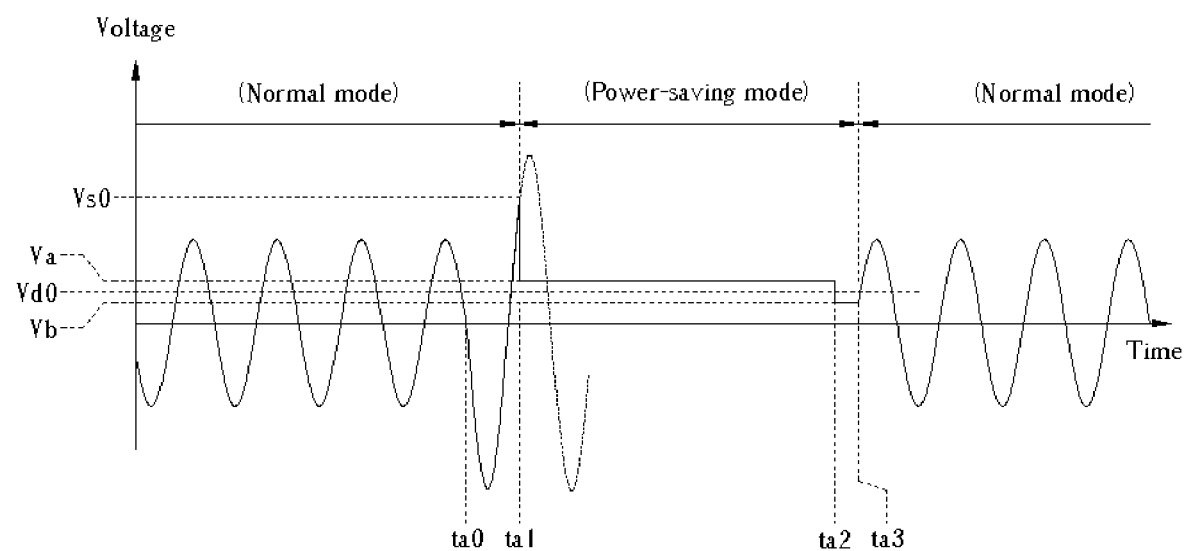
FIG. 5 illustrates the waveform-timing diagram of output voltage when the playing apparatus of FIG. 2 is operating.

To further describe the situation in which the output circuit 54 operates in the normal mode and the power-saving mode, please refer to FIG. 5 (also FIG. 2 to FIG. 4). FIG. 5 illustrates the waveform-timing diagram of output signal voltage of the output circuit 54 at the node N1 in different modes. The X-axis of FIG. 5 represents time and the Y-axis of FIG. 5 represents voltage magnitude. If the output cable 56 is connected to the output end 66 before time point ta0 to make the output circuit 62 operate in the normal mode, signals at node N1 are the output signals 61B. At time ta0, a user takes off the output end 66 from the output end 66, and the total output impedance of the signal circuit 62 at node N1 will become larger and make the amplitude of the signal voltage at the node N1 also become larger (as shown in FIG. 3 and FIG. 4). As shown in FIG. 5, after time point ta0, the amplitude of the signal voltage at the node N1 becomes larger and exceeds the voltage level Vs0 defined by the signal threshold voltage Vs at time ta1 (the voltage level Vs0 is Vs/As. FIG. 5 illustrates the signal voltage of the node N1, but the comparator 74 compares if the voltage at the node N1 amplified by As times is larger than the signal threshold voltage Vs. Equivalently speaking, the comparator 74 compares if the voltage at the node N1 is larger than Vs0=Vs/As.)

In the embodiment of FIG. 5, as long as the voltage at node N1 exceeds the voltage level Vs0, the latch 80A in the control circuit 72 (FIG. 2) will latch the compared result. The logic controller 80B sets the output circuit 54 in the power-saving mode according to the compared result. In the present invention, the latch 80A can be a non-returning zero (NRZ) latch. In other words, when the value stored by the latch changes from digit "0" to digit "1", the latched value of latch 80A will not change unless a "reset" action is performed. Thus, when the comparator 74 at time ta1 detects that the voltage of node N1 has changes from the value smaller than the voltage level Vs0 to the value larger than the voltage level Vs0, the value in the latch 80A can change from "0" to "1" and is latched to digit "1" so as to trigger the logic controller 80B to make the output circuit 54 operate in the power-saving mode.

As shown in FIG. 5, when the output circuit 54 operates in the power-saving mode at time point ta1, the signal circuit 62 stops functioning and provides a low power detecting signal 61C to the node N1 (please also refer to FIG. 4). In the embodiment of the present invention, the signal circuit 62 in the power-saving mode will provide a DC (like constant current) detecting signal to the node N1. Since the detecting signal 61C is a DC signal, the voltage of the node N1 will maintain a constant voltage level Va, as shown in FIG. 5. The comparator 74 will keep comparing if the voltage of the node N1 amplified by Ad times is smaller than the detecting threshold voltage Vd(or equivalently, to compare if the voltage of the node N1 is smaller than the voltage level Vd0, Vd0=Vd/Ad). Because power and voltage level of the detecting signal 61C is lower, the amplifier 78 in the power-saving mode can amplify the voltage of the node N1 by a bigger amplification rate Ad for convenience of comparison. In addition, in the power-saving mode, the amplifier 78 can provide functions of level shifting or others to shift the voltage of the node N1 and make the comparison more precise.

Assume at time point ta2, the user connects the output cable 56 to the output end 66 again to make the output cable 56 connect to the output circuit 54. The total impedance of the signal circuit 62 at the node N1 changes from Zo before ta2 to Zt after ta2 (as shown in FIG. 4 and FIG. 3). Accordingly, the signal voltage at the node N1 will change from the voltage level Va to the voltage level Vb (Vb=Va*Zt/Zo), which is lower than the voltage level Vd0 defined by the detecting threshold voltage Vd. According to this voltage change, the control circuit 72 can determine that the output cable 56 connects to the output circuit 54 again at time point ta3 (in fact, time difference between ta2 and ta3 is very small) and control the output circuit 54 to operate in the normal mode. Then, the signal circuit 62 executes signal processing and transforms video/audio data signals 61A provided by the access circuit 52 to the output signal 61B. In summary, the present invention determines if the output cable 56 connects to the output circuit 54 by using the signal voltage of the node N1 and dynamically switches the apparatus to the normal mode or the power-saving mode. In the normal mode, the signal circuit 62 of the present invention transforms the data signal 61A to the output signal 61B. The decision module 70 determines if the output cable 56 disconnects with the playing apparatus 50 by comparing if the output signal 61B at the node N1 is larger than a predetermined threshold value (voltage level Vs0). In the power-saving mode, the signal circuit 62 only needs to provide a low power detecting signal 61C and the control circuit 72 determines if the playing apparatus 50 reconnects the output cable 56 by comparing if the detecting signal 61C is smaller than another predetermined threshold value (voltage level Vd0).

Figure 6:
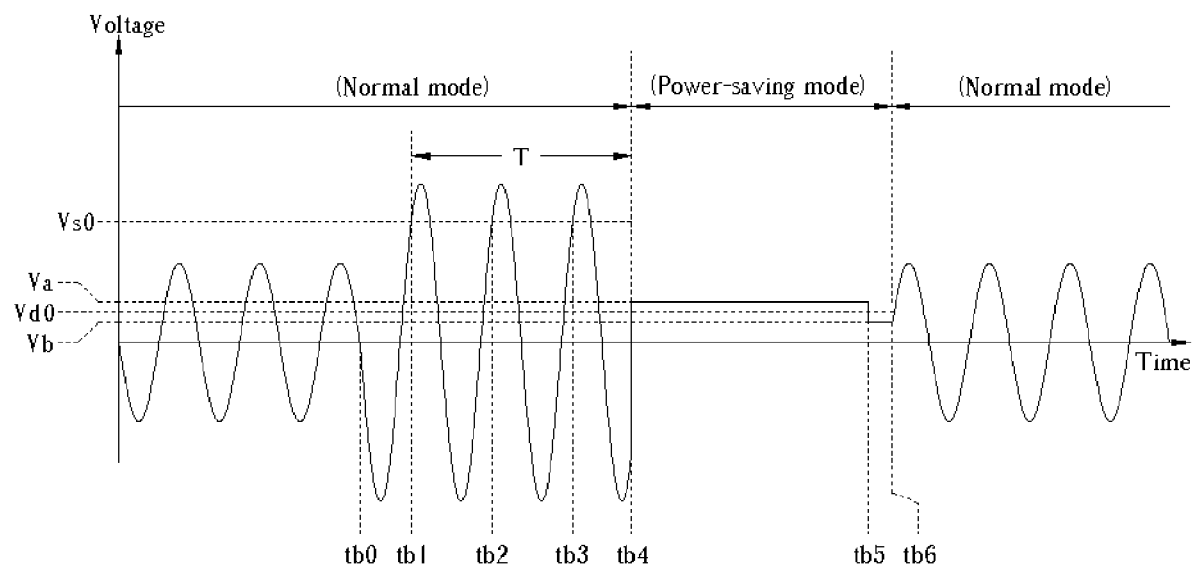
FIG. 6 illustrates the waveform-timing diagram of output voltage when the playing apparatus of FIG. 2 in another embodiment is operating.

In the present invention, when the signal circuit 62 operates in the normal mode, the output signal 61B output by the signal circuit 62 at the node N1 is usually a time-varying signal. Thus, the present invention can take advantage of characteristics of the time-varying signals to determine if the output cable 56 re-connects to the playing apparatus 50 more precisely. As for the situation, please refer to FIG. 6 (also FIG. 2 to FIG. 4). FIG. 6 illustrates the waveform-timing diagram of signal voltage at the node N1 in another embodiment of the playing apparatus 50. The X-axis stands for time while the Y-axis stands for voltage magnitude. Suppose that the output cable 56 connects to the playing apparatus 50 before time point tb0, so the output circuit 54 operates in the normal mode and voltage amplitude at node N1 is smaller than the voltage level Vs0 that the signal threshold voltage Vs defines. At time point tb0 when users take off the output cable 56 from the playing apparatus 50 and the total output impedance of the signal circuit 62 at node N1 is changed, the voltage level of the output signal 61B at node N1 is larger than level Vs0. In the embodiment of FIG. 6, the control circuit 72 will keep calculating how many times the output signal 61B exceeds voltage level Vs0 after a predetermined period after voltage at the node N1 is larger than the level Vs0. As long as the amount of times the output signal 61B exceeds voltage level Vs0 is larger than a predetermined value, it is known that the output cable 56 is not connected to the node N1. Generally speaking, output signals that the signal circuit 62 generates by video/audio data signals 61A have some specifications. For example, the conventional video signals have a maximum every hundredth of a second. If period T is 0.05 seconds, it is expected that there are 3 to 4 signal maximums during the period T. According to this characteristic of the signal, the present invention can definitely determine if the output cable 56 is connecting to the playing apparatus 50 even if the output signal 61B at the node N1 is time-varying.

As shown in FIG. 6, the comparator 74 detects that maximum of output signal 61B at the node N1 exceeds voltage level Vs0 for three times at time points tb1, tb2 and tb3. The number of times satisfies the predetermined value, so it is determined that the output cable 56 is not connected to the node N1. Therefore the decision module 70 makes the output circuit 54 operate in the power-saving mode at time tb4 after time segment T and provides a constant detecting signal 61C to the node N1. When the output cable 56 connects to the playing apparatus 50 again at time tb5, voltage level at node N1 will be smaller than the level Vd0 because the total impedance of the node N1 becomes smaller. The decision module 70 is triggered at time point tb6 to control the output circuit 54 to operate in the normal mode. To count the number of times that the output signal 61B exceeds the level Vs0, if latch 80A(FIG. 2) is implemented by the latch of non-return-to-zero, the logic controller 80B must reset latching in these times. For example, as shown in FIG. 6, logic controller 80B resets the latch 80A at time points tb1, tb2 and tb3.

Figure 7:
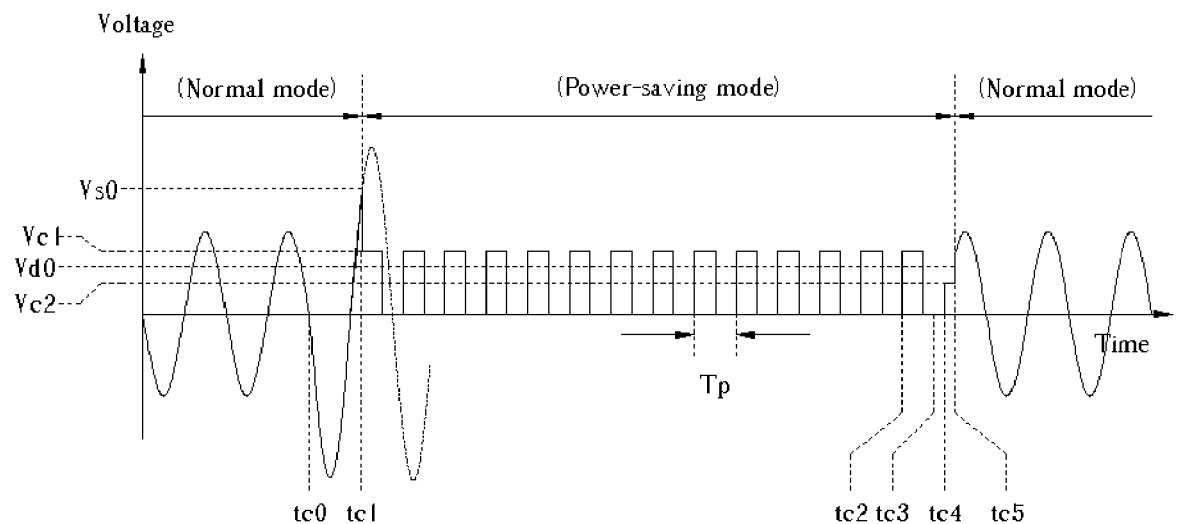
FIG. 7 illustrates the waveform-timing diagram of output voltage when the playing apparatus of FIG. 2 in still another embodiment is operating.

In addition, the signal circuit 62 of the present invention can output time-varying detecting signal 61C to the node N1 to determine if the output cable 56 connects to the output circuit 54 by the voltage change of the detecting signal 61C. As for this situation, please refer to FIG. 7. FIG. 7 illustrates the waveform-timing diagram of output voltage of the playing apparatus 50 at the node N1 in another embodiment. The X-axis represents time and the Y-axis represents voltage magnitude. Suppose the output cable 56 is taken off from the playing apparatus 50 at time tc0 so that the output circuit 54 operates in the power saving mode. In the embodiment of FIG. 7, the signal circuit 62 provides the detecting signal 61C, which is a rectangular time-varying signal and has a period of Tp, to the node N1 at time tc1. In the former part of every period, the detecting signal 61C maintains a constant current signal and in the latter part of the period, the detecting signal 61C can be zero. The logic controller 80B can determine if the output cable 56 connects to the node N1 by checking if the signal at the node N1 changes in the former part of each period. For example, if the output cable 56 at time tc3 (the latter part of a first period) reconnects to the output circuit 54, the voltage at the node N1 will become smaller in the former part of the next period (that is time tc4) because the total output impedance is smaller. The voltage at the node N1 decreases from the voltage Vc1 to the voltage Vc2, which is smaller than the voltage Vd0 defined by the detecting threshold voltage Vd. According to the voltage change, the decision module 70 can find that the output cable 56 reconnects to the node N1 and make the output circuit 54 operate in the normal mode at time tc5.

In summary, the present invention sets up a decision module in the output device of the playing apparatus and determines if the output cable connects the playing apparatus according to voltage signals from the output port to the output device. When the decision module determines that the output cable disconnects with the output port, the output circuit is forced to operate in a power-saving mode and generates a detecting signal of low power so as to keep detecting output voltage to check if the output cable reconnects to the output port. Compared with the conventional method in which the output cable is mechanically detected, the present invention electrically detects the output cable. The detecting mechanism and the signal circuit are integrated by circuit level, avoiding inconvenience of combination of mechanical engineering and electrical engineering as well as mistakes of operation due to mechanical abrasion. Besides, the decision module 70 of the present invention can be integrated with the signal circuit 62 in the chip of the output circuit 54, so the output circuit 54 of the present invention does not need additional pins to receive the signals of the mechanically-driven switches in the conventional invention. Thus, the output circuit of the present invention is simple, reduces cost, and decreases time of manufacture. Because the signal circuit of the present invention generates a detecting signal in the power-saving mode without coordination of the video/audio apparatus, the present invention is compatible with other video/audio apparatuses.

As mentioned before, an ordinary playing apparatus has a plurality of output ends. In the application of the present invention, each output end can have an independent decision module to detect each output end. The present invention could not only be used in a video/audio player but also other kinds of players. For example, the access circuit 52 of the playing apparatus 50 can be a wireless transmitting module or a network module accessing video/audio signals from cable/wireless networks. Of course, the present invention can be applied to sound cards or graphic cards of the computer system in order to detect if they are connected to the output cable.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An output circuit comprising:
    an output port electrically connected to an output cable in a detachable manner;
    a signal circuit electrically connected to the output port for providing a signal current to the output port; and
    a decision module comprising:
        a comparator electrically connected to the output port for comparing whether the signal voltage of the output port is larger than a predetermined detecting threshold when the decision module determines that the output port is not electrically connected to the output cable, and for determining whether the output port is electrically re-connected to an output cable according to the comparison result of the comparator; and
        an amplifier electrically connected between the output port and the comparator for amplifying the signal voltage of output port when the decision module determines that the output port is not electrically connected to the output cable, wherein the comparator compares whether the amplified signal voltage of output port is larger than the detecting threshold.

2. The output circuit of claim 1 wherein the decision module comprises a comparator for comparing whether the signal voltage of the output port is larger than a predetermined signal threshold and the comparison result of the comparator determines whether the output port is electrically connected to the output cable.

3. The output circuit of claim 2 wherein the decision module determines that the output port is not electrically connected to the output cable if the signal voltage of the output port is larger than the signal threshold.

4. A method for detecting whether an output port of a circuit is electrically connected to an output cable, the method comprising:
    (a) receiving a signal from the output port;
    (b) determining whether the output port is electrically connected to the output cable according to a signal voltage of output port;
    (c) operating the circuit in a normal mode when it is determined that the output port is electrically connected to the output cable;
    (d) operating the circuit in a power-saving mode and providing a low power detecting signal to the output port when it is determined that the output port is not electrically connected to the output cable; and
    (e) amplifying the signal voltage of the output port when the circuit is operating in the power-saving mode, and comparing whether the amplified signal voltage of the output port is larger than a predetermined detecting threshold, then determining whether the output port is electrically connected to the output cable according to the comparison result.

5. The method of claim 4 wherein the step (b) comprises determining whether the output port is electrically connected to the output cable is according to whether the signal voltage of the output port is larger than a predetermined signal threshold.

6. The method of claim 5 wherein it is determined that the output port is not electrically connected to the output cable when the signal voltage of the output port is larger than the signal threshold.

7. The method of claim 4 wherein it is determined that the output port is not electrically re-connected to the output cable when the signal voltage of the output port is less than the detecting threshold.

8. The method of claim 4 further comprising providing an output signal to the output port when it is determined that the output port is electrically re-connected to an output cable, and comparing whether the signal voltage of the output port is larger than a predetermined detecting threshold, then determining whether the output port is electrically connected to the output cable according to the comparison result.

9. An output circuit comprising:
   an output port for electrically connecting to an output cable in a detachable manner;
   a signal circuit for providing a signal current to the output port; and
   a decision module for electrically connecting to the output port and determining whether the output port is electrically connected to the output cable according to a signal voltage of the output port, the decision module comprising:
   a control circuit for operating the signal circuit in a normal mode when it is determined that the output port is electrically connected to the output cable, and for operating the signal circuit in a power-saving mode when it is determined that the output port is not electrically connected to the output cable;
   a comparator for comparing whether the signal voltage of the output port is larger than a predetermined detecting threshold when the signal circuit is operating in the power-saving mode, the decision module determining whether the output port is re-connected to an output cable according to the comparison result of the comparator; and
   an amplifier electrically connected between the output port and the comparator, wherein when the signal circuit is operating in the power-saving mode, the amplifier amplifies the signal voltage of the output port, and the comparator compares whether the amplified signal voltage of the output port is larger than the detecting threshold.

10. The output circuit of claim 9 wherein the decision module comprises a comparator for comparing whether the signal voltage of the output port is larger than a predetermined signal threshold and the decision module determines whether the output port is electrically connected to the output cable according to the comparison result of the comparator.

11. The output circuit of claim 9 further comprising:
   a storing circuit for providing a data signal and reading the data on an optical disc to generate the data signal.

* * * * *